(12) United States Patent
Acker et al.

(10) Patent No.: US 10,884,727 B2
(45) Date of Patent: *Jan. 5, 2021

(54) ROLLING UPGRADE OF A DISTRIBUTED APPLICATION

(71) Applicant: International Business Machines Corporation, Armonk, NY (US)

(72) Inventors: Warren P. Acker, Oronoco, MN (US); Steven G. Halverson, Rochester, MN (US); Schuman M. Shao, Rochester, MN (US); Michael J. E. Spicer, Lafayette, CA (US)

(73) Assignee: International Business Machines Corporation, Armonk, NY (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/717,718

(22) Filed: May 20, 2015

(65) Prior Publication Data
US 2016/0342408 A1 Nov. 24, 2016

(51) Int. Cl.
*G06F 8/65* (2018.01)
*H04L 29/08* (2006.01)

(52) U.S. Cl.
CPC .............. *G06F 8/65* (2013.01); *H04L 67/10* (2013.01)

(58) Field of Classification Search
CPC ........................................................ G06F 8/65
USPC ....................................................... 717/170
See application file for complete search history.

(56) References Cited

U.S. PATENT DOCUMENTS

| | | | |
|---|---|---|---|
| 5,881,219 A * | 3/1999 | Leung | G06F 11/3664 714/31 |
| 7,831,967 B2 | 11/2010 | Won et al. | |
| 8,387,037 B2 | 2/2013 | Henseler et al. | |
| 8,595,378 B1 * | 11/2013 | Cohn | H04L 65/4076 709/238 |
| 2004/0179518 A1 * | 9/2004 | Bruckman | H04L 12/42 370/358 |
| 2005/0182498 A1 * | 8/2005 | Landou | G05B 15/02 700/20 |
| 2008/0177780 A1 * | 7/2008 | Tan | G06F 17/30038 |
| 2012/0192173 A1 * | 7/2012 | Price | G06F 8/65 717/172 |
| 2014/0090063 A1 * | 3/2014 | Calnan | G06F 8/68 726/25 |
| 2014/0351807 A1 * | 11/2014 | Wen | G06F 8/656 717/173 |
| 2015/0007157 A1 * | 1/2015 | Park | G06F 8/65 717/170 |

(Continued)

OTHER PUBLICATIONS

Apache ZooKeeper; Jan. 5, 2015; http://zookeeper.apache.org/.

*Primary Examiner* — Chat C Do
*Assistant Examiner* — Bradford F Wheaton
(74) *Attorney, Agent, or Firm* — Patterson + Sheridan, LLP

(57) ABSTRACT

Embodiments presented herein describe techniques for performing a rolling upgrade to a distributed runtime environment that includes a cluster of computing systems. A first of a plurality of computing nodes executing a first version of a runtime environment determines a second version of the runtime environment via a registry. Upon determining that the second version is a more recent version, the first computing node retrieves an install package for the second version from a second one of the computing nodes. The first computing node installs the second version using the install package.

11 Claims, 6 Drawing Sheets

(56) References Cited

U.S. PATENT DOCUMENTS

| | | | |
|---|---|---|---|
| 2015/0058298 A1* | 2/2015 | Earl | G06F 11/1425 707/674 |
| 2016/0034357 A1* | 2/2016 | Anglin | G06F 11/1458 714/4.11 |
| 2016/0162270 A1* | 6/2016 | Kumar | G06F 8/61 717/177 |
| 2016/0295377 A1* | 10/2016 | Ibarra | H04W 4/06 |

* cited by examiner

ROLLING UPGRADE OF A DISTRIBUTED APPLICATION

BACKGROUND

Embodiments presented herein generally relate to distributed computing, and more specifically, to managing upgrades of a distributed runtime environment.

A distributed runtime environment may comprise a cluster of computing systems (or "nodes"). Each node may execute a distributed application within the runtime environment. The distributed application may receive streams of input data in real-time that need to be processed in some manner. Typically, to set up the distributed runtime environment to accommodate the application, an administrator manually uploads an install package to a cluster node (e.g., to a "master" node in the cluster). The install package includes the modules, libraries, and the like needed for the node to provide a framework for the distributed application. Further, the administrator extracts the contents of the package and installs the contents.

Occasionally, the distributed runtime environment may require updates, e.g., for bug fixes, added features, etc. In such a case, the administrator manually uploads an upgrade install package to each cluster node. The administrator then has to install the contents of the package on each node. Because the administrator installs the upgrade to each individual node, the upgrade process may be time-consuming and tedious.

SUMMARY

One embodiment presented herein describes a method. The method generally includes determining, by a a first one of a plurality of computing nodes executing a first version of a runtime environment, a second version of the runtime environment via a registry. Upon determining that the second version is a more recent version than the first version, an install package for the second version is retrieved from a second one of the plurality of computing nodes. The first one of a plurality of computing nodes installs the second version using the install package.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Figure 1:
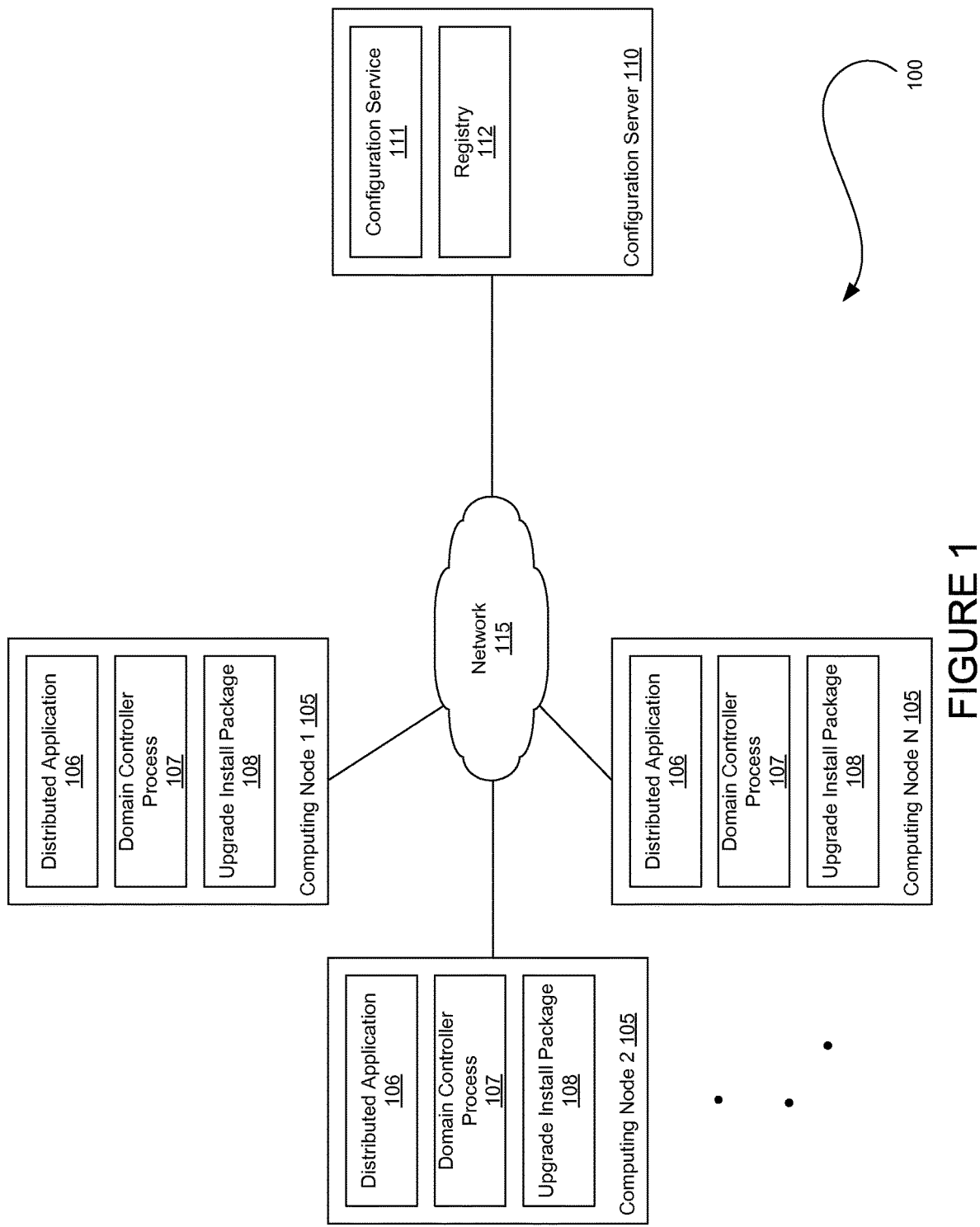
FIG. 1 illustrates an example computing environment, according to one embodiment.

Embodiments presented herein describe techniques for performing a rolling upgrade to a distributed runtime environment that includes a cluster of computing systems (or "nodes"). As an example, embodiments may be adapted to a runtime environment for a distributed application. The distributed application receives and analyzes information from numerous sources in real-time. The runtime environment provides services such as processing elements, data operators executing within those processing elements, etc.

In one embodiment, each node executes a domain controller process. The domain controller process is a service that monitors the runtime environment and the status of other cluster nodes. To do so, the domain controller process regularly communicates with a configuration service. The configuration service manages interprocess communications within the runtime environment and registers services of each node. Further, the configuration service maintains a registry of nodes in the runtime environment. The registry may include information of available nodes, failed nodes, services registered to each node, a version of the runtime environment on each node, which node is a "master" node, etc.

Upgrades to the runtime environment may be released, e.g., to fix bugs, add new features, modify existing features, and the like. When an upgrade is distributed, an administrator may suspend the runtime environment and run an upgrade install package on a cluster node, e.g., the master node. The domain controller process can then update the node to the latest version of the runtime environment using the upgrade install package. After installation, the domain controller process restarts the node. Once restarted, the domain controller process advertises, to the configuration service, the version of the runtime environment corresponding to the version provided by the upgrade install package. In addition, the domain controller process may store a secondary install package on the node. The administrator restarts the runtime environment on the other nodes.

In one embodiment, when a runtime environment is restarted on a given node, the domain controller process on that node registers its services with the configuration service along with a version of the runtime environment currently executing on the node. The domain controller process also retrieves version information from the configuration service of other nodes in the cluster. In such a case, the domain controller process may determine that the version of the runtime environment on the node is not the most recent version. The domain controller process identifies, via the configuration service, nodes that are currently running the most recent version of the runtime environment.

The domain controller process then selects any of the identified nodes. The domain controller process request the secondary install package from the selected node. The selected node may initiate a transfer of the package, queue the process (e.g., if the maximum amount of transfers is in progress), or reject the request (e.g., if the maximum amount of nodes are queued). If the selected node rejects the node, then the node can select any other of the identified nodes to download the secondary install package from. Once downloaded, the domain controller process can install the upgrade, restart the node, and advertise the version to the configuration services. As a result, the node can subsequently provide the upgrade install package for download to other cluster nodes. Consequently, the load distribution of the install package to other nodes is relatively balanced across the cluster.

Advantageously, techniques presented herein provide an automated approach to upgrading a distributed framework. That is, an administrator installs an upgrade package to an individual cluster node. Other nodes in the cluster can determine, through a configuration service, that an upgrade to the framework is available. This approach eliminates the need for the administrator to manually upgrade each individual node. Instead, once a given node determines that a more recent version of the upgrade is available, the node can negotiate a download transfer of an upgrade install package from nodes that have already upgraded. The domain controller process executing on that node can then install the upgrade. Further, the approach is scalable. For instance, in a cluster of many nodes, a given node may select randomly from multiple nodes that have already upgraded to download the upgrade install package, thereby reducing the burden on a single node for transmitting the upgrade install package to requesting nodes in the cluster.

Note, the following describes a runtime environment for a distributed application that receives and analyzes massive amounts of data from numerous sources in real-time. However, one of skill in the art will recognize that the embodiments presented herein may be adapted to various types of distributed environments.

FIG. 1 illustrates an example computing environment 100, according to one embodiment. As shown, computing environment 100 includes multiple computing nodes 105 and a configuration server 110. The computing nodes 105 and the configuration 110 are connected to one another via a network 115. In one embodiment, computing environment 100 is a runtime environment framework for a distributed application 106 executing on each of the computing nodes 105. The distributed application 106 receives, analyzes, and correlates information sent from numerous sources in real-time. The distributed application 106 provides processing elements that include operators that perform a variety of functions on data received from these sources. For example, the distributed application 106 may receive massive amounts of message data from various sources. A given operator may preprocess the data for further analysis (e.g., formatting the data to be machine-readable) and send the data to another operator. In turn, the other operator may filter messages that include some specified term for one or more other operators to process.

In one embodiment, each computing node 105 may be a physical computing system (e.g., as part of a rack of systems in a data center). The computing nodes 105 form a distributed cluster performing services on behalf of the distributed application 106. In one embodiment, one of the computing nodes 105 may be designated as a "master" node for the cluster. Each computing node 105 further includes a domain controller process 107.

In one embodiment, the domain controller process 107 of a given node manages services of the distributed application 106 that are provided on that node. Further, the domain controller process 107 monitors the runtime environment. To do so, the domain controller process 107 communicates with a configuration service 111 executing on the configuration server 110. The configuration service 111 maintains a registry 112. A given domain controller process 107 can reference the registry 112 (via the configuration service 111) for status information regarding the runtime environment. For example, the registry 112 provides information regarding whether a given node in the distributed runtime environment is online, a version of the runtime environment that the node is running, a version of the runtime environment used to start processes on the distributed cluster, and the like.

When a node 105 starts up in the runtime environment, the domain controller process 107 registers services of the node 105. In addition, the domain controller process 107 registers a version number corresponding to the current version of the runtime environment executing on the node 105. Further, the domain controller process 107 also registers down-level versions that have are installed or have been provisioned to the node 105. The domain controller process 107 may also determine the latest version of the runtime version executing on other nodes 105. In one embodiment, the configuration service 111 is an Apache Zookeeper service. Of course, embodiments presented herein may adapt a variety of networked registries.

An administrator may upgrade the runtime environment. To do so, the administrator may suspend the domain controller process 107 on each node 105 (e.g., by performing a stop command from a given node 105 that shuts down the nodes 105 in the entire domain). The administrator may then upload an upgrade install package 108 to the master node 105 and install the upgrade. Once installed, the administrator may restart the domain controller process 107 on each node 105 (e.g., by performing a start command from a given node 105 that restarts processes on nodes 105 of entire domain). A secondary upgrade install package 108 may remain in a file system directory of the master node 105. At start-up, a domain controller process 107 of a given node 105 advertises a version of the runtime environment currently executing on the node 105 to the configuration service 111. The domain controller process 107 also compares, via the configuration service 111, a current version running on that node to versions advertised by other nodes. If a more recent version is available, then the domain controller process 107 may request the secondary upgrade install package 108 from one of the nodes 105 that are executing the more recent version.

For example, in the initial case, a node 105 (other than the master node 105) may determine that the master node 105 is currently running the more recent version of the runtime environment. The node 105 negotiates a transfer of the secondary upgrade install package 108 with the master node 105. In turn, the master node 105 can allow the transfer, queue the node 105 (e.g., if the master node 105 is already transferring the upgrade install package 108 to a maximum amount of nodes 105), or reject the transfer (e.g., if the master node 105 is already queuing a maximum amount of nodes 105). If successfully negotiated, the node 105 retrieves the upgrade install package 108 from the master node 105. The domain controller process 107 may apply the upgrade install package 108 and restart. At restart, the domain controller process 107 of that node 105 can advertise the more recent version to the configuration service 111. As a result, other nodes 105 may identify that node 105 as also running the more recent version of the runtime. Consequently, the other nodes 105 may also download the upgrade install package 108 from that node 105. This reduces the burden of requests to the master node 105. Further, as nodes 105 upgrade to the more recent version of the runtime environment, the nodes 105 may more evenly distribute the upgrade install package 108 across the cluster.

In one embodiment, nodes 105 in the distributed cluster may provision down-level versions of the runtime environment to other nodes 105 that may require such versions. As stated, each node 105 may register down-level versions of the runtime environment to the networked registry. Doing so allows other nodes 105 to identify that a given node 105 has an install package for a down-level version of the runtime environment in the event that the other nodes 105 require the down-level version. The node 105 may distribute the down-level version to other nodes 105 that request the version.

Figure 2:
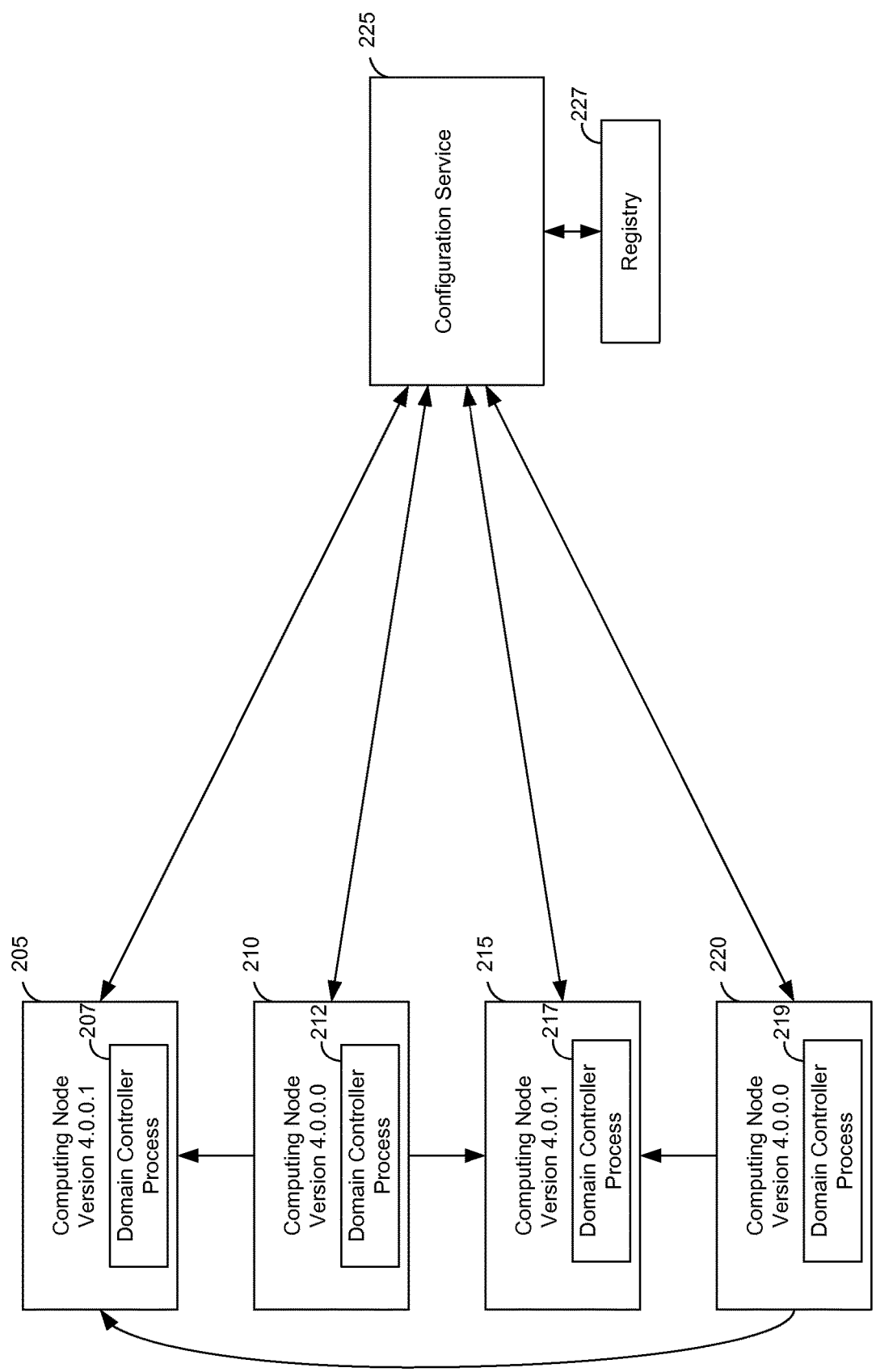
FIG. 2 illustrates an example of rolling a runtime environment upgrade to nodes of a computing cluster, according to one embodiment.

FIG. 2 illustrates an example of rolling a runtime environment upgrade to nodes of a computing cluster, according to one embodiment. In this example, the distributed cluster includes computing nodes 205, 210, 215, and 220, each including a domain controller process 207, 212, 217, and 219, respectively. Nodes 210 and 220 are executing version 4.0.0.0 of the runtime environment. Nodes 205 and 215 are upgraded from version 4.0.0.0 to 4.0.0.1 of the runtime environment.

Illustratively, each of the nodes 205-220 communicate with a configuration service 225 (as depicted by the two-way arrows between the nodes and the configuration service). The configuration service 225 maintains a registry 227. As stated, the registry 227 can contain information regarding the status of the runtime environment, such as node availability, node addresses, version information, etc. Through the registry 227, the domain controller processes 207-219 determine a version of the runtime environment of the nodes in the cluster. Doing so allows each domain controller process 207-219 to determine whether the respective node 205-220 is executing a most recent version of the runtime environment.

In this case, the domain controller processes 212 and 219 determine that respective nodes 210 and 220 are not executing the most recent version of the runtime environment, i.e., nodes 210 and 220 are executing version 4.0.0.0 and not 4.0.0.1. If so determined, the domain controller processes 212 and 219 then retrieve an upgrade install package corresponding to the most recent version of the runtime environment from one of the computing nodes 205 or 215.

For example, the domain controller process 212 may negotiate a transfer of the package from either nodes 205 or 215 (as depicted by the one way arrows from computing node 210). For instance, the domain controller process 212 may select, at random, computing node 205. Based on the current load, the computing node 205 can allow a transfer, queue the node 210, or reject the transfer. If the computing node 205 rejects the transfer, the domain controller process 212 may select computing node 215 instead and request the update install package.

Once downloaded, the domain controller process 212 upgrades the runtime environment executing on the computing node 210 from version 4.0.0.0 to 4.0.0.1. The domain controller process may thereafter advertise the version to the configuration service 225. Doing so allows other nodes in the cluster (e.g., computing node 220) to identify the computing node 210 as having the most recent version of the runtime environment.

Figure 3:
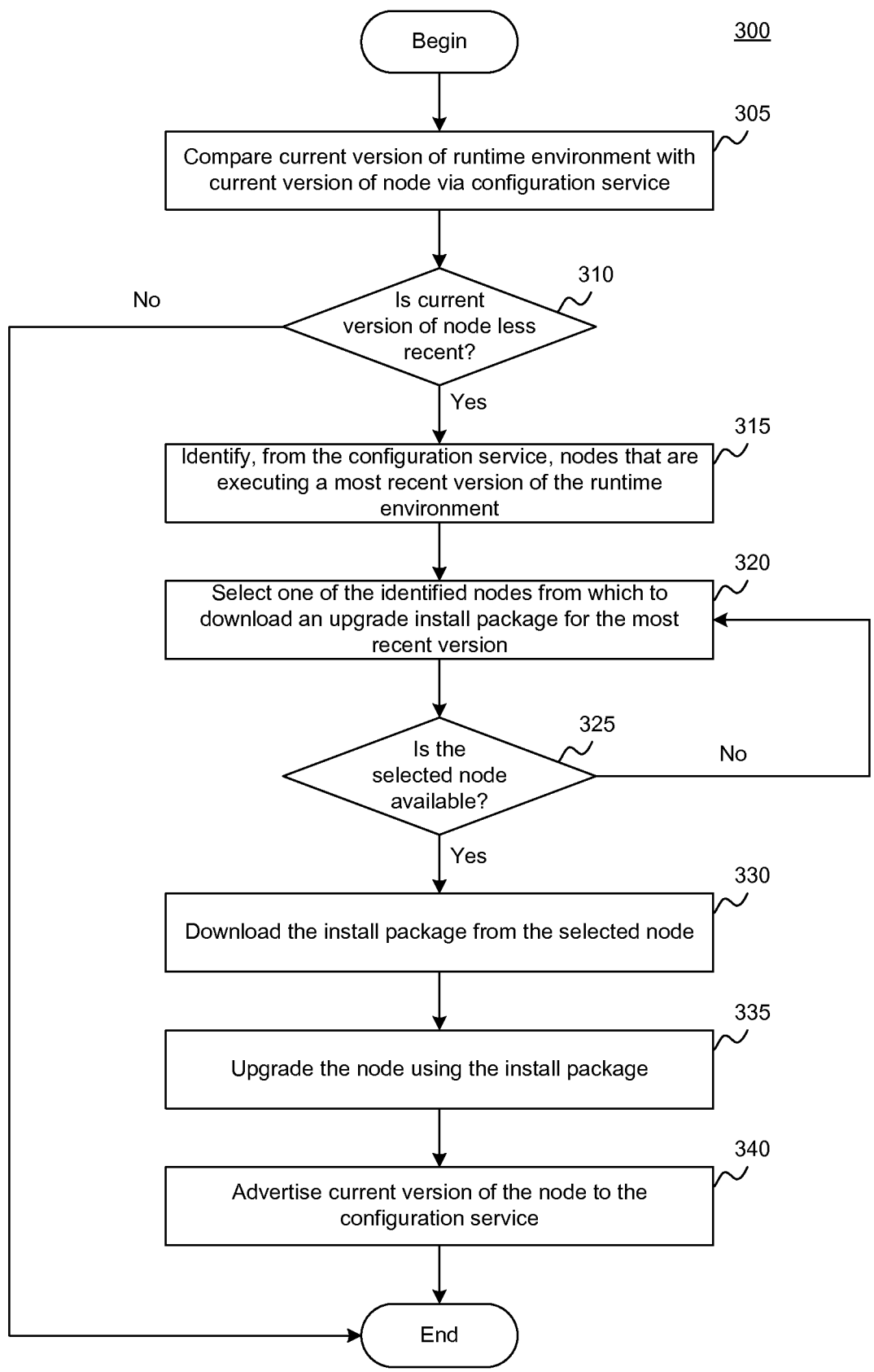
FIG. 3 illustrates a method for upgrading a node to a current version of a distributed runtime environment, according to one embodiment.

FIG. 3 illustrates a method 300 for upgrading a node to a current version of a distributed runtime environment, according to one embodiment. In particular, method 300 may be performed by a domain controller process executing on a given node in the distributed cluster. Method 300 begins at step 305, where the domain controller process compares a current version of the runtime environment of the node with the version of the runtime environment used to start the processes on the distributed cluster. As stated, the domain controller process retrieves version information of other nodes from the configuration service.

At step 310, the domain controller process determines whether the current version executing on that node is less recent than the version used to start the domain. If not, then the node is currently executing the most recent version of the runtime environment, and thus, method 300 ends. Otherwise, the node is not executing the most recent version of the runtime environment. In this case, at step 315, the domain controller process identifies, via the configuration service, nodes in the cluster that are executing the most recent version of the runtime environment. As stated, each node provides a secondary upgrade install package that is accessible to other nodes in the cluster. The domain controller process unpacks and uses the upgrade install package to upgrade the node.

At step 320, the domain controller process selects (e.g., at random) one of the identified nodes to attempt downloading the upgrade install package. The domain process negotiates a transfer with the selected node, and at step 325, the domain controller process determines whether the selected node is available. In some cases, the selected node may be serving a maximum amount of nodes in the cluster and therefore might be unable to allow the transfer to the domain controller process. In such a case, the domain controller process again selects one of the identified nodes until another node is able to accommodate the transfer.

At step 330, the domain controller process downloads the upgrade install package from the selected node. At step 335, the domain controller process upgrades the node using the install package. Doing so results in the node executing in the most recent version of the runtime environment. Further, the domain controller process stores an upgrade install package that allows other nodes to upgrade to the most recent version of the runtime environment.

At step 340, the domain controller process advertises, to the configuration service, that the node is executing the most recent version of the runtime environment. As a result, other nodes that query the configuration service can determine that the node is at the most recent version. In addition, nodes that have not upgraded to the most recent version can download the upgrade install package from that node.

Figure 4:
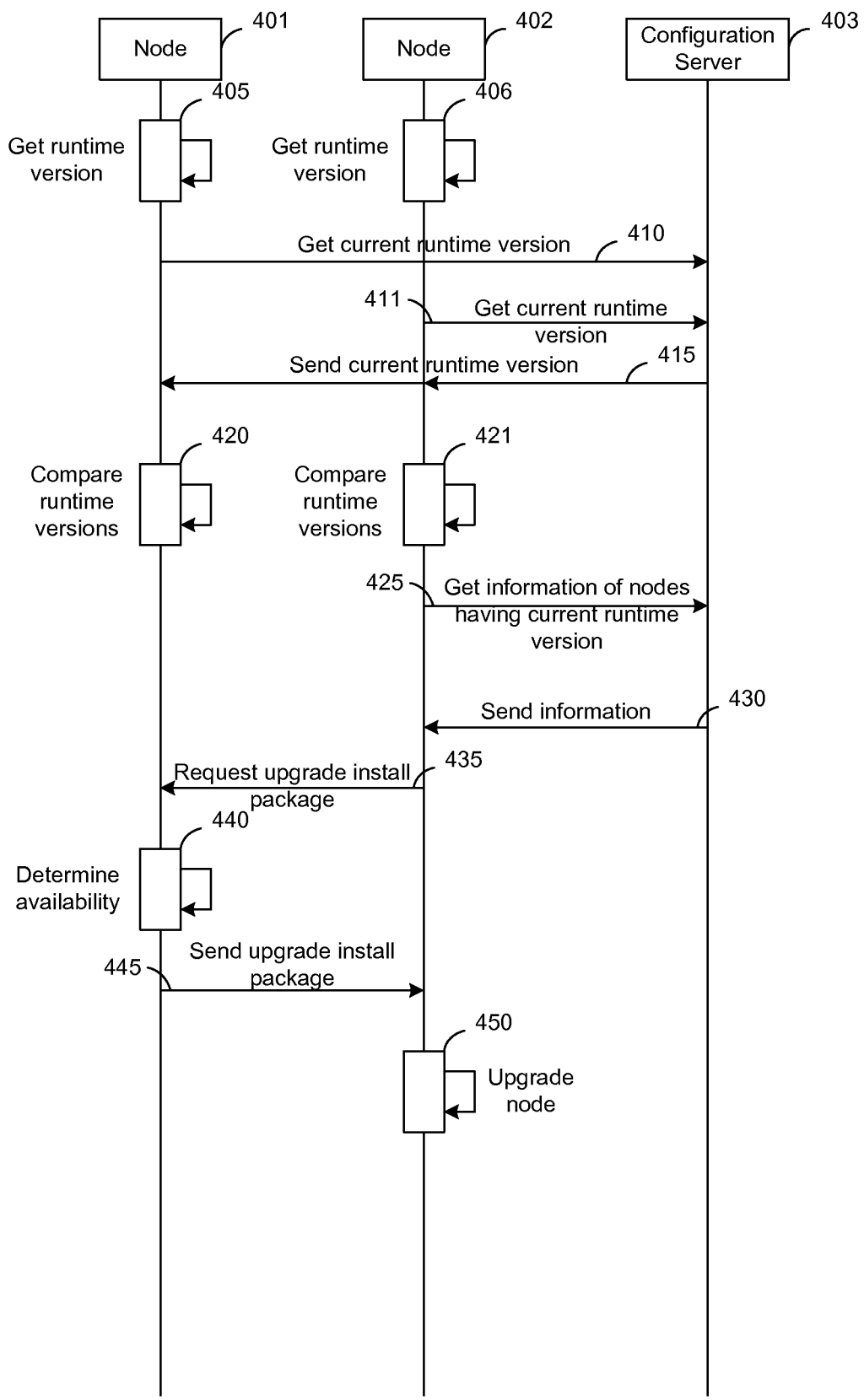
FIG. 4 illustrates a sequence for upgrading a node to a current version of a distributed runtime environment, according to one embodiment.

FIG. 4 illustrates a sequence for upgrading a node to a current version of a distributed runtime environment, according to one embodiment. In particular, the sequence describes interactions between a node 401, a node 402, and a configuration server 403.

At 405, the domain controller process of node 401 determines the current runtime environment version number of the node 401. Similarly, at 406, the domain controller process of node 402 does the same. At 410 and 411, the domain controller processes of nodes 401 and 402 determine the current runtime environment version of other nodes in the cluster. At 415, the service of configuration server 403 sends the current runtime version information to nodes 401 and 402.

At 420, node 401 compares its runtime environment version with the versions advertised over the configuration service. In this example, the node 401 determines that its current version is the most recent version. At 421, node 402 compares its runtime environment version with the versions advertised over the configuration service. The node 402 determines that its current version is not the most recent version.

At 425, node 402 identifies nodes having the most recent runtime version via the configuration server 403. At 430, the configuration server sends the version information. In this example, node 402 identifies node 401 as having the most recent version of the runtime environment. At 435, node 402 requests an upgrade install package from node 401. At 440, node 401 determines whether node 401 is available to accommodate the request. At 445, node 401 sends the upgrade install package to node 402. At 450, node 402 upgrades using the install package.

Figure 5:
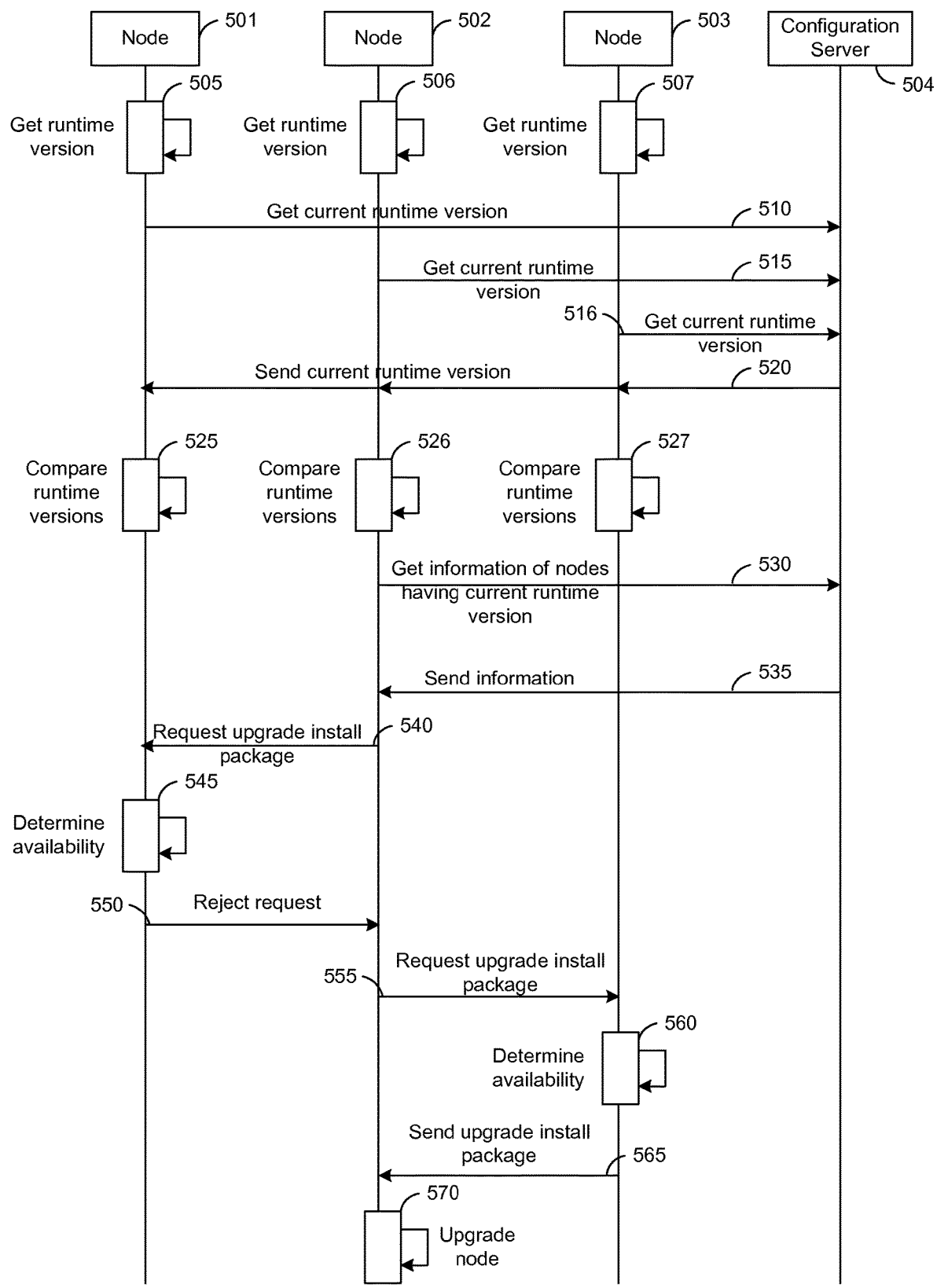
FIG. 5 illustrates a sequence for upgrading a node to a current version of a distributed runtime environment, according to one embodiment.

FIG. 5 illustrates a sequence for upgrading a node to a current version of a distributed runtime environment, according to one embodiment. In particular, the sequence describes interactions between a node 501, a node 502, node 503, and a configuration server 504.

At 505, the domain controller process executing in node 501 gets its current runtime environment version number. Similarly, at 506 and 507, the domain controller process of nodes 502 and 503 do the same. At 510, 515, and 516, the domain controller processes of nodes 501-503 get the current runtime environment version of other nodes in the cluster. At 520, the service of configuration server 504 sends the current runtime version information to nodes 501-503.

At 525, node 501 compares its runtime environment version with the versions advertised over the configuration service. At 527, node 503 compares its runtime environment version with the versions advertised over the configuration service. In this example, the nodes 501 and 503 are executing the most recent version of the runtime environment. At 526, node 502 compares its runtime environment version with the versions advertised over the configuration service. The node 502 determines that its current version is not the most recent version.

At 530, node 502 identifies nodes having the most recent runtime version via the configuration server 504. At 535, the configuration server 504 sends the version information. In this example, node 502 identifies nodes 501 and 503 as having the most recent version of the runtime environment. At 540, node 502 requests an upgrade install package from node 501. At 545, node 501 determines whether node 501 is available to accommodate the request. In this example, node 501 is unable to accommodate the request (e.g., the node 501 is serving a maximum amount of nodes). At 550, node 501 rejects the request.

At 555, node 502 requests the upgrade install package from node 503. At 560, node 503 determines whether node 503 is available to accommodate the request. At 565, node 503 sends the upgrade install package to node 502. At 570, node 502 upgrades using the install package.

Figure 6:
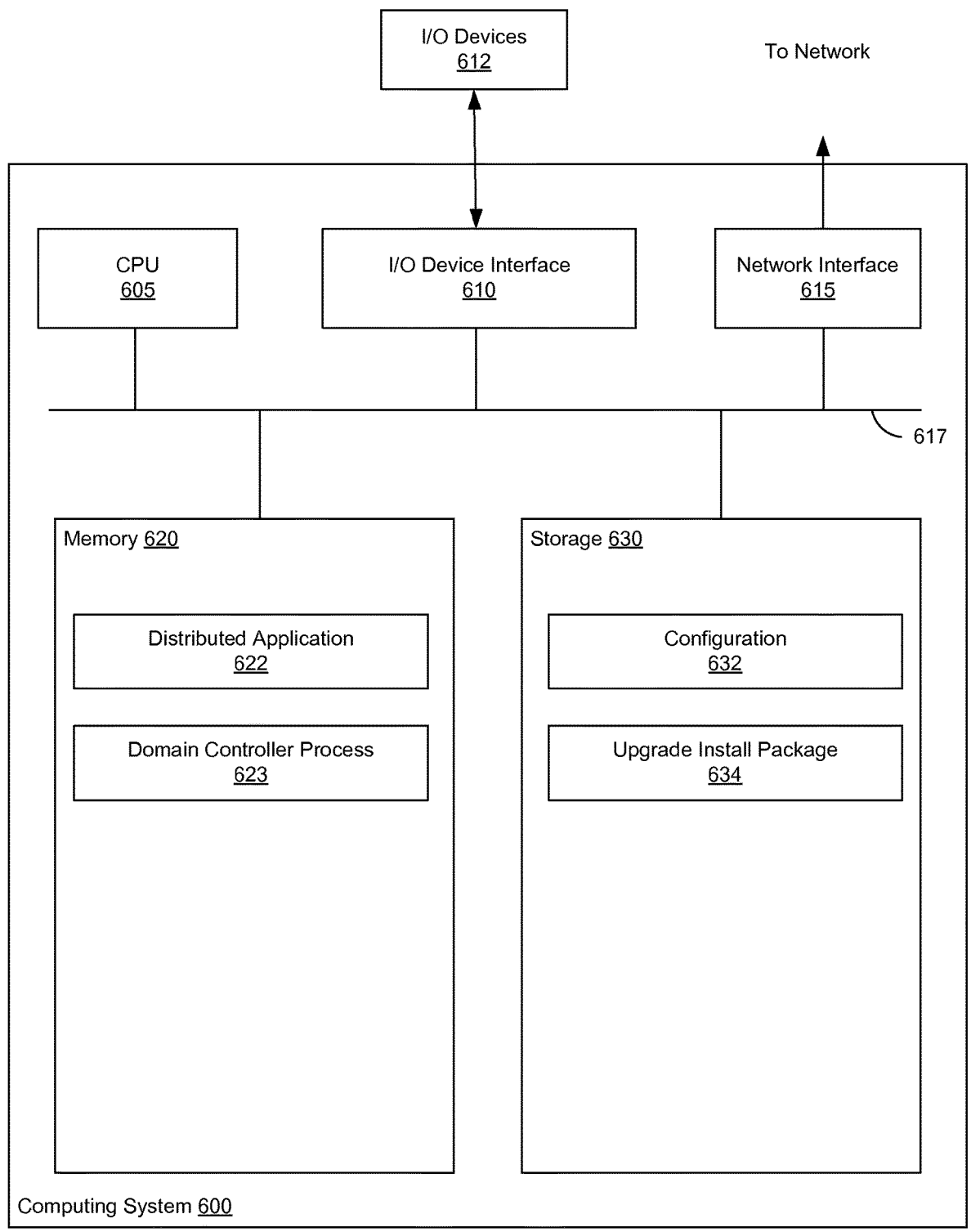
FIG. 6 illustrates a computing system configured to upgrade to a current version of a distributed runtime environment, according to one embodiment.

FIG. 6 illustrates a computing system 600 configured to upgrade to a current version of a distributed runtime environment, according to one embodiment. As shown, the computing system 600 includes, a central processing unit (CPU) 605, a network interface 615, a memory 620, and storage 630, each connected to a bus 617. The computing system 600 may also include an I/O device interface 610 connecting I/O devices 612 (e.g., keyboard, display and mouse devices) to the computing system 600. Further, in context of this disclosure, the computing elements shown in the computing system 600 may correspond to a physical computing system. Further, the computing system 600 corresponds to a node in a distributed cluster of nodes.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 617, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a distributed application 622 and a domain controller process 623. And storage 630 includes a configuration 632 and an upgrade install package 633. The distributed application 622 analyzes massive amounts of data within a runtime environment. The domain controller process 623 manages the runtime environment. For instance, the domain controller process 623 updates the runtime environment when an upgrade is available. To do so, the domain controller process 623 communicates with a configuration server to identify a version of the runtime environment executing on other nodes. If the version is more recent than the version executing on the computing system 600 (e.g., based on the configuration 632 describing the version), the domain controller process 623 identifies nodes in the runtime environment executing the most recent version via the configuration service. The domain controller process 623 downloads the upgrade install package 633 from one of the nodes and installs the upgrade. Thereafter, the domain controller process 623 may advertise the most recent version of the runtime environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product, comprising:
   a computer-readable storage medium having computer-readable program code embodied therewith, the computer-readable program code configured to perform an operation comprising:
   upon receiving a stop command at a first node of a plurality of nodes executing a runtime environment, suspending the runtime environment on the first node, wherein the stop command is received from a master node of the plurality of nodes;
   upon receiving a restart command from the master node, restarting the runtime environment on the first node, wherein subsequent to transmitting the stop command and prior to transmitting the restart command, the master node is upgraded by an administrator;
   upon restarting the runtime environment on the first node, determining, by the first node, a second version of the runtime environment via a registry maintained by a configuration server;
   upon determining, by the first node, that the second version is a more recent version than the first version, automatically:
      transmitting, by the first node, to the configuration server, a request for a list of nodes of the plurality of computing nodes that are executing the second version of the runtime environment and are able to provide an install package for the second version, wherein the registry maintains records indicating which install packages are available on each of the plurality of computing nodes;
      receiving, by the first node, from the configuration server, the list of nodes that are executing the second version and have the install package for the second version, wherein the list of nodes includes at least a second node and a third node of the plurality of nodes, and does not include the configuration server;
      requesting, by the first node, the install package for the second version from the second node, wherein the second node was randomly selected from the list of nodes by the first node;
      receiving, by the first node, from the second node, the requested install package for the second version; and
      installing the second version on the first node using the install package;
   upon successfully installing the second version on the first node, restarting the runtime environment on the first node for a second time;
   upon restarting for the second time, advertising, by the first node, to the configuration server, an indication that the first node is executing the second version of the runtime environment and that the install package for the second version is available for download from the first node, wherein, responsive to the advertising, the configuration server updates the registry by adding the first node to the list of nodes that are available to provide the second version of the runtime environment;
   advertising, to the configuration server, availability of a down-level version of the runtime environment on the first node;
   receiving, at the first node, from a fourth node of the plurality of computing nodes, a request to obtain the install package for the second version of the runtime environment, wherein the fourth node transmitted the request responsive to receiving an indication of the first node from the configuration server;
   sending, by the first node, the install package of the second version to the fourth node;
   receiving a request from a fifth node of the plurality of computing nodes to obtain the install package for the second version of the runtime environment; and upon determining that the first node is not available to transmit the install package, refraining from sending the install package of the second version to the fifth node.

2. The computer program product of claim 1, wherein the operation further comprises:
receiving a request from a sixth node of the plurality of computing nodes to obtain an install package for the down-level version of the runtime environment; and
sending the install package of the down-level version to the sixth node.

3. The computer program product of claim 1, the operation further comprising:
requesting, by the first node, the install package for the second version from the third node; and
receiving an indication that the third node is not available to transfer the install package.

4. The computer program product of claim 3, wherein requesting the install package for the second version from the second node is performed upon receiving the indication from the third node.

5. The computer program product of claim 1, wherein the runtime environment provides a framework hosting a distributed application.

6. The computer program product of claim 1, wherein requesting the install package for the second version from the second one of the plurality of computing nodes is performed responsive to determining that the second one of the plurality of computing nodes is executing the second version.

7. A system, comprising:
a processor; and
a memory storing a program, which, when executed on the processor, performs an operation comprising:
upon receiving a stop command at a first node of a plurality of nodes executing a runtime environment, suspending the runtime environment on the first node, wherein the stop command is received from a master node of the plurality of nodes;
upon receiving a restart command from the master node, restarting the runtime environment on the first node, wherein subsequent to transmitting the stop command and prior to transmitting the restart commend, the master node is upgraded by an administrator;
upon restarting the runtime environment on the first node, determining, by the first node, a second version of the runtime environment via a registry maintained by a configuration server;
upon determining, by the first node, that the second version is a more recent version than the first version, automatically:
transmitting, by the first node, to the configuration server, a request for a list of nodes of the plurality of computing nodes that are executing the second version of the runtime environment and are able to provide an install package for the second version, wherein the registry maintains records indicating which install packages are available on each of the plurality of computing nodes;
receiving, by the first node, from the configuration server, the list of nodes that are executing the second version and have the install package for the second version, wherein the list of nodes includes at least a second node and a third node of the plurality of nodes, and does not include the configuration server;
requesting, by the first node, the install package for the second version from the second node, wherein the second node was randomly selected from the list of nodes by the first node;
receiving, by the first node, from the second node, the install package for the second version; and
installing the second version on the first node using the install package;
upon successfully installing the second version on the first node, restarting the runtime environment on the first node for a second time;
upon restarting for the second time, advertising, by the first node, to the configuration server, an indication that the first node is executing the second version of the runtime environment and that the install package for the second version is available for download from the first node, wherein, responsive to the advertising, the configuration server updates the registry by adding the first node to the list of nodes that are available to provide the second version of the runtime environment;
advertising, to the configuration server, availability of a down-level version of the runtime environment on the first node;
receiving, at the first node, from a fourth node of the plurality of computing nodes, a request to obtain the install package for the second version of the runtime environment, wherein the fourth node transmitted the request responsive to receiving an indication of the first node from the configuration server;
sending, by the first node, the install package of the second version to the fourth node;
receiving a request from a fifth node of the plurality of computing nodes to obtain the install package for the second version of the runtime environment; and
upon determining that the first node is not available to transmit the install package, refraining from sending the install package of the second version to the fifth node.

8. The system of claim 7, wherein the operation further comprises:
receiving a request from a sixth node of the plurality of computing nodes to obtain an install package for the down-level version of the runtime environment; and
sending the install package of the down-level version to the fifth sixth node.

9. The system of claim 7, the operation further comprising:
requesting, by the first node, the install package for the second version from the third node; and
receiving an indication that the third node is not available to transfer the install package.

10. The system of claim 9, wherein requesting the install package for the second version from the second node is performed upon receiving the indication from the third node.

11. The system of claim 7, wherein requesting the install package for the second version from the second one of the plurality of computing nodes is performed responsive to determining that the second one of the plurality of computing nodes is executing the second version.

* * * * *